US012769076B2

(12) United States Patent
Watanabe et al.

(10) Patent No.: US 12,769,076 B2
(45) Date of Patent: Oct. 20, 2026

(54) OPTICAL FIBER RIBBON AND PRODUCTION METHOD FOR PRODUCING SAME

(71) Applicant: SWCC Corporation, Kawasaki (JP)

(72) Inventors: Ken Watanabe, Kawasaki (JP); Takehiko Yamamoto, Kawasaki (JP); Takeshiro Nagai, Kawasaki (JP); Yuki Ota, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 358 days.

(21) Appl. No.: 18/574,467

(22) PCT Filed: Jul. 29, 2022

(86) PCT No.: PCT/JP2022/029316
§ 371 (c)(1),
(2) Date: Dec. 27, 2023

(87) PCT Pub. No.: WO2024/024091
PCT Pub. Date: Feb. 1, 2024

(65) Prior Publication Data
US 2025/0102757 A1 Mar. 27, 2025

(51) Int. Cl.
*G02B 6/44* (2006.01)

(52) U.S. Cl.
CPC ........... *G02B 6/448* (2013.01); *G02B 6/4482* (2013.01)

(58) Field of Classification Search
CPC ..... G02B 6/448; G02B 6/4482; G02B 6/4403
See application file for complete search history.

(56) References Cited

U.S. PATENT DOCUMENTS 5,379,363 A * 1/1995 Bonicel ................ G02B 6/4482 385/100
5,485,539 A * 1/1996 Mills .................... G02B 6/4482 347/4
(Continued)

FOREIGN PATENT DOCUMENTS

JP 2007178883 A 7/2007
JP 2012247464 A 12/2012
(Continued)

OTHER PUBLICATIONS

PCT International Search Report and Written Opinion for International Application No. PCT/JP2022/029316, dated Sep. 6, 2022, 8pp.

*Primary Examiner* — Tina Wong
(74) *Attorney, Agent, or Firm* — The Roy Gross Law Firm, LLC; Roy D. Gross

(57) ABSTRACT

To provide an optical fiber ribbon having an identification region for identification, in which optical transmission loss is less likely to occur even when the optical fiber ribbon is accommodated in a cable at a high density. An optical fiber ribbon for achieving the above objective is an optical fiber ribbon including a plurality of single-core coated optical fibers disposed in parallel and a plurality of coupling portions disposed between adjacent ones of the single-core coated optical fibers. The optical fiber ribbon includes an identification region in which a plurality of dots are disposed on the single-core coated optical fibers and/or the coupling portions, and a ratio of a total area of the dots disposed on each of the single-core coated optical fibers to an area of the single-core coated optical fiber is less than or equal to 20% when the identification region is seen in plan view.

3 Claims, 4 Drawing Sheets

(56) References Cited

U.S. PATENT DOCUMENTS

| | | | | |
|---|---|---|---|---|
| 2018/0321454 | A1 | 11/2018 | Sato et al. | |
| 2019/0204519 | A1 | 7/2019 | Sato et al. | |
| 2019/0219783 | A1* | 7/2019 | Ly | G02B 6/4403 |
| 2021/0053338 | A1 | 2/2021 | Sekine et al. | |
| 2021/0181451 | A1* | 6/2021 | Sato | G02B 6/567 |
| 2021/0286143 | A1 | 9/2021 | Kondapalli et al. | |
| 2021/0325624 | A1 | 10/2021 | Yamaguchi et al. | |
| 2022/0026652 | A1* | 1/2022 | Kuramitsu | G02B 6/443 |
| 2022/0244481 | A1* | 8/2022 | Gomatam | G02B 6/448 |

FOREIGN PATENT DOCUMENTS

| | | | |
|---|---|---|---|
| JP | 2013088619 | A | 5/2013 |
| JP | 2017125931 | A1 | 7/2017 |
| JP | 2019181729 | A | 10/2019 |
| WO | 2017/145955 | A1 | 8/2017 |
| WO | 2020/045372 | A1 | 3/2020 |

* cited by examiner

OPTICAL FIBER RIBBON AND PRODUCTION METHOD FOR PRODUCING SAME

CROSS REFERENCE TO RELATED APPLICATIONS

This application is a National Phase of PCT Patent Application No. PCT/JP2022/029316 having International filing date of Jul. 29, 2022 the contents of which are incorporated herein by reference in their entirety.

TECHNICAL FIELD

The present invention relates to an optical fiber ribbon and a production method for producing the same.

BACKGROUND ART

In recent years, data traffic has increased dramatically due to popularization of Internet of Things (IoT), full-scale 5G commercialization, autonomous driving of automobiles, and so on, and worldwide demand has been increasing for the maintenance and construction of high-speed and high-capacity optical fiber communication networks that support such traffic.

In particular, information communication cables in European and American countries are often laid in underground ducts, and are physically constrained by the laying space in the ducts. In order to economically realize the maintenance and construction of high-speed and high-capacity optical fiber communication networks in the European and American countries, it is important to accommodate a greater number of single-core coated optical fibers in existing ducts.

When the cables are branched or a specific single-core coated optical fiber is drawn into a building from the cables, it is necessary to select the specific single-core coated optical fiber from among a large number of single-core coated optical fibers. Conventionally, identifying the single-core coated optical fibers has been often performed based on the colors of the single-core coated optical fibers. Further, such identification has also been performed based on accommodation positions of the single-core coated optical fibers by disposing a plurality of accommodation parts in the cables. Furthermore, forming marks for identification on individual single-core coated optical fibers by an inkjet method or the like has also been performed (for example, Patent Literature (hereinafter, referred to as "PTL") 1).

CITATION LIST

Patent Literature

PTL 1

Japanese Patent Application Laid-Open No. 2012-247464

SUMMARY OF INVENTION

Technical Problem

However, when the single-core coated optical fibers are accommodated in the cables at high density as described above, the colors of the single-core coated optical fibers and/or the patterns of the identification marks are finite. Further, identification of the single-core coated optical fibers also has had a problem that, when the identification marks are complicated, it is difficult to distinguish them. Meanwhile, when a plurality of accommodation parts are disposed in each of the cables, it is difficult to increase the number of single-core coated optical fibers that can be accommodated in the cable.

In recent years, an optical fiber ribbon in which a plurality of single-core coated optical fibers are coupled to one another has been put into practical use. Therefore, it is conceivable to form a mark for identification on such an optical fiber ribbon. When the mark for identification is formed on the optical fiber ribbon, the number of patterns can be significantly reduced as compared with a case where a mark for identification is formed on each single-core coated optical fiber. Further, according to the aforementioned method, identification of the patterns is facilitated.

However, the present inventors have intensively studied to have found that when forming a region (also referred to herein as "identification region") in which dots for identification or the like are disposed on an optical fiber ribbon by an inkjet method or the like, optical transmission loss is likely to occur, and, particularly when optical fiber ribbons are accommodated in a cable at high density, the optical transmission loss is likely to occur.

A main object of the present invention is to provide an optical fiber ribbon having an identification region for identification, in which optical transmission loss is less likely to occur even when the optical fiber ribbon is accommodated at a high density in a cable, and a production method for producing the same.

Solution to Problem

In order to solve the above problem, according to one aspect of the present invention, an optical fiber ribbon is provided, the optical fiber ribbon comprising:

- a plurality of single-core coated optical fibers disposed in parallel; and
- a plurality of coupling portions disposed between adjacent ones of the plurality of single-core coated optical fibers, in which
- the optical fiber ribbon includes an identification region in which a plurality of dots are disposed on the plurality of single-core coated optical fibers and/or the plurality of coupling portions, and
- a ratio of a total area of the plurality of dots disposed on each of the plurality of single-core coated optical fibers to an area of the single-core coated optical fiber is less than or equal to 20% when the identification region is seen in plan view.

According to another aspect of the present invention, a production method for producing an optical fiber ribbon is provided, the production method including:

- preparing a tape-shaped core cable including a plurality of single-core coated optical fibers disposed in parallel and a plurality of coupling portions disposed between adjacent ones of the plurality of single-core coated optical fibers; and
- forming an identification region by dropping ink onto the plurality of single-core coated optical fibers and/or the plurality of coupling portions of the tape-shaped core cable using an inkjet method to form a plurality of dots, in which
- in the forming the identification region, the ink is dropped such that a ratio of a total area of the plurality of dots formed on each of the plurality of single-core coated optical fibers to an area of the single-core coated optical fiber is less than or equal to 20% when the identification region is seen in plan view.

Advantageous Effects of Invention

An optical fiber ribbon of the present invention makes it possible to easily identify coated optical fiber cables, and even when accommodated at high density in a cable, makes it less likely for optical transmission loss to occur.

DESCRIPTION OF EMBODIMENTS

Hereinafter, an optical fiber ribbon and a production method for producing the same according to a preferred embodiment of the present invention will be described. With respect to the description "to" indicating a numerical range, the lower limit value and the upper limit value are included in the numerical range in the present specification.

[Optical Fiber Ribbon]

Figure 1:
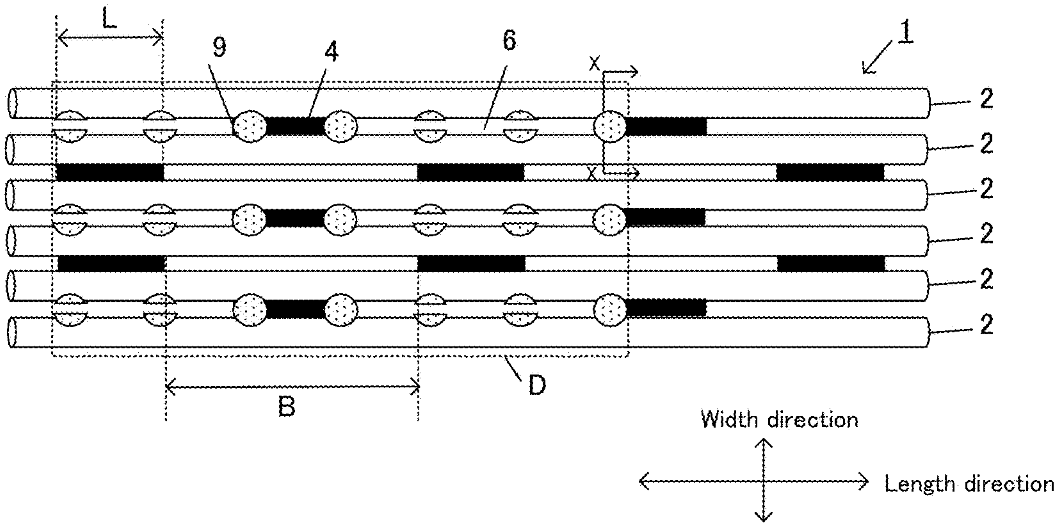
FIG. 1 is a plan view illustrating a schematic configuration of an optical fiber ribbon according to an embodiment of the present invention.

FIG. 1 is a plan view illustrating a schematic configuration of optical fiber ribbon 1.

As illustrated in FIG. 1, optical fiber ribbon 1 of the present embodiment includes a plurality of (six in FIG. 1) single-core coated optical fibers (hereinafter, also simply referred to as "optical fibers") 2 disposed in parallel, and a plurality of coupling portions 4 disposed between adjacent optical fibers 2. Further, optical fiber ribbon 1 has identification region D in which a plurality of dots 9 are disposed on optical fibers 2 and/or coupling portions 4.

Figure 2:
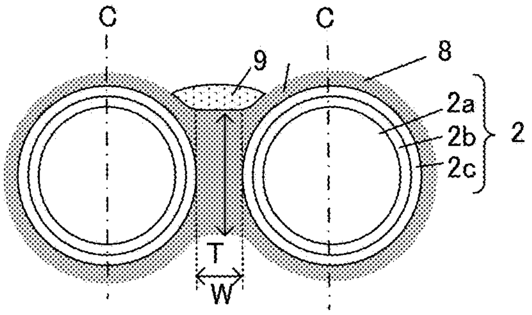
FIG. 2 is a cross-sectional view of FIG. 1 taken along line X-X.

FIG. 2 is a cross-sectional view that is taken along line X-X in FIG. 1 and that illustrates a schematic configuration of optical fiber ribbon 1.

Optical fiber ribbon 1 of the present embodiment includes a plurality of optical fibers 2. The number of optical fibers 2 included in one optical fiber ribbon 1 is appropriately selected according to the application of optical fiber ribbon 1, but is usually about 2 to 12.

As illustrated in FIG. 2, each of optical fibers 2 has a configuration in which optical fiber strand 2*a* is coated with primary coating layer 2*b* and secondary coating layer 2*c* successively, and the optical fiber strand, primary coating layer, and secondary coating layer are the same as an optical fiber strand, first coating layer, and second coating layer of a known optical fiber. A colored layer (not illustrated) is usually formed further on secondary coating layer 2*c* of each optical fiber 2. It is preferable that the colors of optical fibers 2 be different from one another in optical fiber ribbon 1. The different colors allow identification of a plurality of optical fibers 2 in one optical fiber ribbon 1.

Further, tape layer 8 is further disposed around the plurality of optical fibers 2, and in the present embodiment, adjacent optical fibers 2 are intermittently coupled to one another by tape layer 8. In this specification, a region in which tape layer 8 is disposed between adjacent optical fibers 2 is referred to as coupling portion 4, and a region in which tape layer 8 is not disposed between adjacent optical fibers 2 is referred to as separating portion 6. In optical fiber ribbon 1 of the present embodiment, coupling portions 4 and separating portions 6 are alternately disposed between adjacent optical fibers 2. It is preferable that separating portions 6 be disposed such that adjacent separating portions 6 partially overlap each other when optical fiber ribbon 1 is observed in the width direction.

Width W of each coupling portion 4 in optical fiber ribbon 1 as seen in plan view, that is, the distance between adjacent optical fibers 2 is not particularly limited, and is greater than, for example, 0 mm and is about 0.04 mm or less. Length L of each coupling portion 4 in optical fiber ribbon 1 as seen in plan view is not particularly limited, but is, for example, about 35 mm or greater and 47 mm or less. Further, thickness T of coupling portion 4 is not particularly limited, but is, for example, about 0.2 mm or greater and 0.3 mm or less. When width W, length L, and thickness T of coupling portion 4 are in the aforementioned ranges, the strength of coupling portion 4 is high, and coupling portion 4 is unlikely to be torn even when optical fiber ribbon 1 is wound along the length direction or twisted as necessary. On the other hand, length B of each separating portion 6 in optical fiber ribbon 1 as seen in plan view is not particularly limited, but is, for example, about 85 mm or greater and 103 mm or less. When the length of separating portion 6 is within the aforementioned range, optical fiber ribbon 1 is easily wound or twisted along the length direction when optical fiber ribbon 1 is accommodated in the cable. Width W, length L, and thickness T of coupling portion 4 and length B of separating portion 6 are average values of measurements at any five places of optical fiber ribbon 1.

Figure 3:
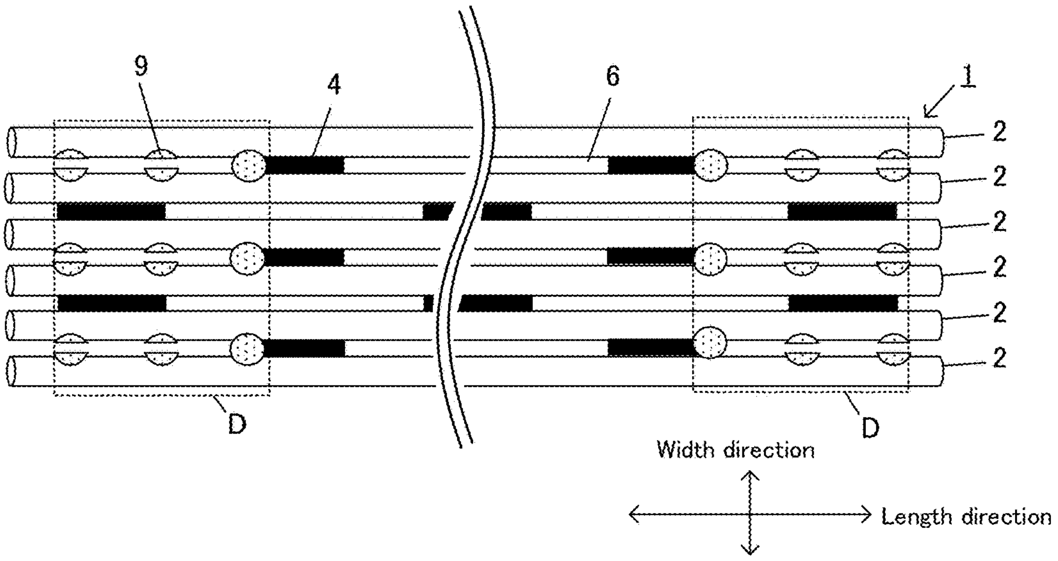
FIG. 3 is a plan view illustrating a variation of the optical fiber ribbon.

Meanwhile, identification region D is a region for identification of corresponding optical fiber ribbon 1, and is a region in which a plurality (group) of dots 9 are disposed on optical fibers 2 and/or coupling portions 4. Dots 9 may be disposed on optical fiber ribbon 1 entirely in the length direction, and entire optical fiber ribbon 1 may be used as identification region D, but optical fiber ribbon 1 is usually very long. Therefore, from the viewpoint of production efficiency and cost, it is preferable that identification region D (a group of dots 9) be disposed only in a partial region of optical fiber ribbon 1. The number of identification regions D disposed on single optical fiber ribbon 1 is not particularly limited, and may be only one, but as illustrated in FIG. 3, it is preferable that identification regions D be disposed at regular intervals. The intervals are selected appropriately.

Here, the "identification region" in the present specification refers to a region from one end to the other end of the group of dots 9 on optical fiber ribbon 1 observed in the length direction. More specifically, among a group of dots 9 on optical fiber ribbon 1 as seen in plan view, dot 9 located on the outermost side in the length direction is specified for each of the one end side and the other end side. Then, two straight lines are drawn in the width direction of optical fiber ribbon 1 so as to be in contact with the outer circumferences of the two dots in the length direction. In this specification, a region including a group of dots 9 surrounded by the two straight lines and opposite ends of optical fiber ribbon 1 in the width direction is referred to as identification region D.

Here, in the present embodiment, the number and size of dots 9 are adjusted such that the ratio of the total area of dots 9 disposed on each individual optical fiber 2 within identification region D as seen in plan view to the area of this optical fiber 2 is less than or equal to 20%. The above ratio is preferably 15.6% or less, and more preferably 6.1% or greater and 15.6% or less.

Figure 4:
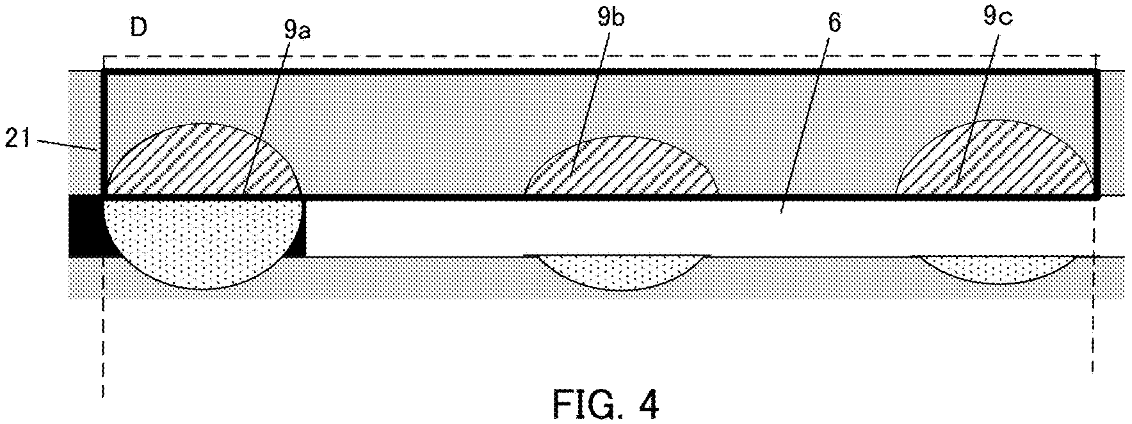
FIG. 4 is a schematic diagram for explaining the position of an identification region of the optical fiber ribbon.

The above ratio is calculated as follows. FIG. 4 is a partially enlarged view (schematic view) of identification region D.

To begin with, specific identification region D is seen in plan view, and the area of each individual optical fiber 2 (here, optical fiber 21) within this identification region D (the area of a region enclosed by a thick line in FIG. 4) is calculated. Since optical fiber 2 is very thin, it is preferable that the area of optical fiber 2 be calculated using a microscope (for example, microscope VHX-100F manufactured by Keyence Corporation, or the like), and the area is calculated to also include the thickness of tape layer 8 adhered to optical fibers 2. Further, since the width of each individual optical fiber 21 (including the thickness of tape layer 8) is usually constant, the area of optical fiber 21 in identification region D can be calculated by specifying the width of optical fiber 21 and the length of identification region D.

Subsequently, the area of dots 9*a*, 9*b*, and 9*c* disposed on optical fiber 21, that is, the area of regions where optical fiber 21 and dots 9*a*, 9*b*, and 9*c* overlap each other (the regions indicated by a hatched line in FIG. 4 is referred to as "overlap regions" hereinafter) is calculated. It is preferable that the calculation of the area be performed using a photograph or the like taken by the aforementioned microscope, and the area of each overlap region can be easily calculated using, for example, shape measurement software (for example, VHX H2M/H1M from Keyence Corporation or the like).

Then, the total area of the overlap regions is divided by the area of optical fiber 21 described above, to calculate the ratio of the total area of dots 9*a*, 9*b*, and 9*c* disposed on optical fiber 21 to the area of optical fiber 21. The calculation of the ratio is performed not only for one optical fiber 21 but also for all the optical fibers. Then, for all the optical fibers, it is checked whether the relationship between the area of each of the optical fiber and the total area of the dots disposed on the optical fiber satisfies the above value.

Here, when optical fiber ribbon 1 has a large number of identification regions D, it is difficult to confirm the above-described ratio for all identification regions D. Therefore, when optical fiber ribbon 1 has a plurality of identification regions D, the above confirmation is performed on at least two identification regions D. Then, in two identification regions D, when all optical fibers 2 satisfy the above-described relationship, optical fiber ribbon 1 may be determined as satisfying specification of the present application.

As described above, when dots for identification are disposed on the optical fiber ribbon at arbitrary positions by a conventional method, optical transmission loss has been likely to increase. The reason for this is not clear, but the following reason is considerable. When the dots for identification are formed by ink application or the like, each of the dots has a certain thickness. When such an optical fiber ribbon is accommodated in a cable at a high density, the dots are pressed by another optical fiber. In particular, when the area of the overlap regions in which the optical fibers overlap the dots is large, a large pressure is likely to be applied to the optical fibers, and the optical transmission loss is considered to be large.

On the other hand, in the present embodiment, the position, shape, and the like of dots 9 are adjusted so that the area where optical fibers 2 and dots 9 overlap each other is reduced. Therefore, it is considered that dots 9 in identification region D are unlikely to be pressed by other optical fibers with a large force, and deterioration in optical transmission loss is unlikely to be caused, even when optical fiber ribbon 1 is accommodated in the cable at high density.

Here, dots 9 only need to be disposed so as to satisfy the above-described ratio, and the arrangement positions of individual dots 9 are not particularly limited. For example, the dots may be disposed on optical fibers 2, on coupling portions 4, or on both of them. Further, in the present embodiment, dots 9 are disposed astride two adjacent optical fibers 2, but the present invention is not limited to the present embodiment. Note that dots 9 disposed astride two optical fibers 2 may be continuous like dot 9*a* on the left side in FIG. 4, or may be divided by separating portion 6 like dot 9*b* or 9*c* located in the middle or on the right side in FIG. 4.

Further, the positional relation of the plurality of dots 9 in identification region D is not particularly limited, and the dots may be disposed with a certain regularity so that optical fiber ribbon 1 can be recognized. In the present embodiment, the plurality of dots 9 are disposed at substantially equal intervals, but optical fiber ribbon 1 may be provided with identifiability by arranging the plurality of dots 9 at different intervals.

Further, the shape of each dot 9 is not particularly limited. Although a plurality of substantially circular dots 9 with the same size and the same color are disposed in the present embodiment, dots 9 with different shapes, different sizes, and/or different colors may be disposed in optical fiber ribbon 1. Further, the shape of dots 9 is not limited to the substantially circular shape, and may be, for example, a polygonal shape.

Further, in the present embodiment, identification regions D are disposed only on one surface of optical fiber ribbon 1, but identification regions D may be disposed on both surfaces of optical fiber ribbon 1.

Note that each dot 9 is preferably a solidified product (or a cured product) of various inks, and in the present embodiment, is a solidified product of a dye ink. Further, the average thickness of the dots is not particularly limited.

VARIATIONS

Figure 5:
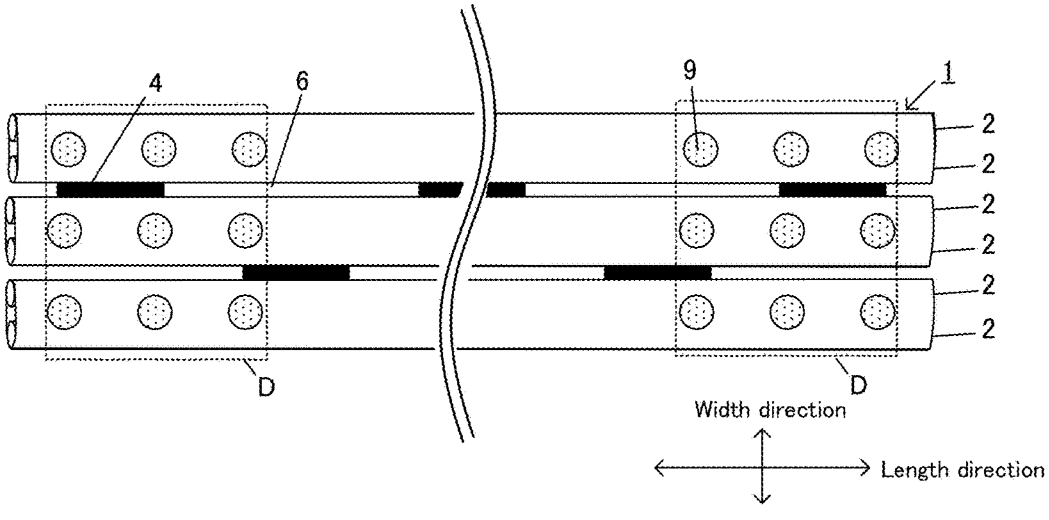
FIG. 5 is a plan view illustrating a variation of the optical fiber ribbon.

In the above description, it has been described that the plurality of optical fibers 2 are independent for each core, and coupling portions 4 and separating portions 6 are disposed between optical fibers 2. However, the structure of optical fiber ribbon 1 is not limited to the above structure. For example, as illustrated in FIG. 5, a plurality of (two in FIG. 5) optical fibers 1 are bundled together, and coupling portions 4 and separating portions 6 may be disposed between the bundles. Also in this case, the number and size of each dot 9 are adjusted such that the ratio of the total area of dots 9 disposed on each individual optical fiber 2 within identification region D of optical fiber ribbon 1 as seen in plan view to the area of this optical fiber 2 is less than or equal to 20%.

[Production Method for Producing Optical Fiber Ribbon]

The production method for producing the optical fiber tape is not particularly limited. For example, the optical fiber tape can be produced by a method including a step of preparing a tape-shaped core cable including a plurality of optical fibers and a plurality of coupling portions (hereinafter, also referred to as a "tape-shaped core cable preparation step"), and a step of dropping ink onto the plurality of optical fibers and/or the plurality of coupling portions of the tape-shaped core cable by an inkjet method to form an identification region including a plurality of dots (hereinafter, also referred to as an "identification region formation step"). Hereinafter, the aforementioned method will be described, but the production method for producing the optical fiber ribbon of the present invention is not limited to the present embodiment.

Tape-Shaped Core Cable Preparation Step

In the tape-shaped core cable preparation step, the tape-shaped core cable including the above-described optical fibers and coupling portions is prepared. The tape-shaped core cable may be a tape-shaped core cable produced by any method, and for example, the tape-shaped core cable may be prepared using production apparatus 10 illustrated in FIG. 6.

Specifically, while the plurality of optical fibers 2 are conveyed in conveyance direction A, an uncured photocurable resin is applied to the plurality of optical fibers 2 in the form of a tape by tape die 20, thereby forming tape layer 8.

Then, separation needles 32, 34, and 36 of separation die 30 are moved up and down with respect to tape layer 8, to remove tape layer 8 partially to form separating portions 6 (and coupling portions 4) described above. In addition, resin suction apparatus 38 sucks the excess photocurable resin blocked by the downward movement of separation needles 32, 34, and 36.

Next, light irradiation apparatus 40 irradiates tape layer 8 with light to semi-cure the uncured photocurable resin. Finally, light irradiation apparatus 50 further irradiates the semi-cured photocurable resin with light to fully cure the semi-cured photocurable resin. Note that, at upstream light irradiation apparatus 40 and downstream light irradiation apparatus 50, the integral irradiation amount of the apparatuses are adjusted such that the integral irradiation amount of upstream light irradiation apparatus 40 is smaller and the integrated irradiation amount of downstream light irradiation apparatus 50 is larger.

Identification Region Formation Step

Figure 6:
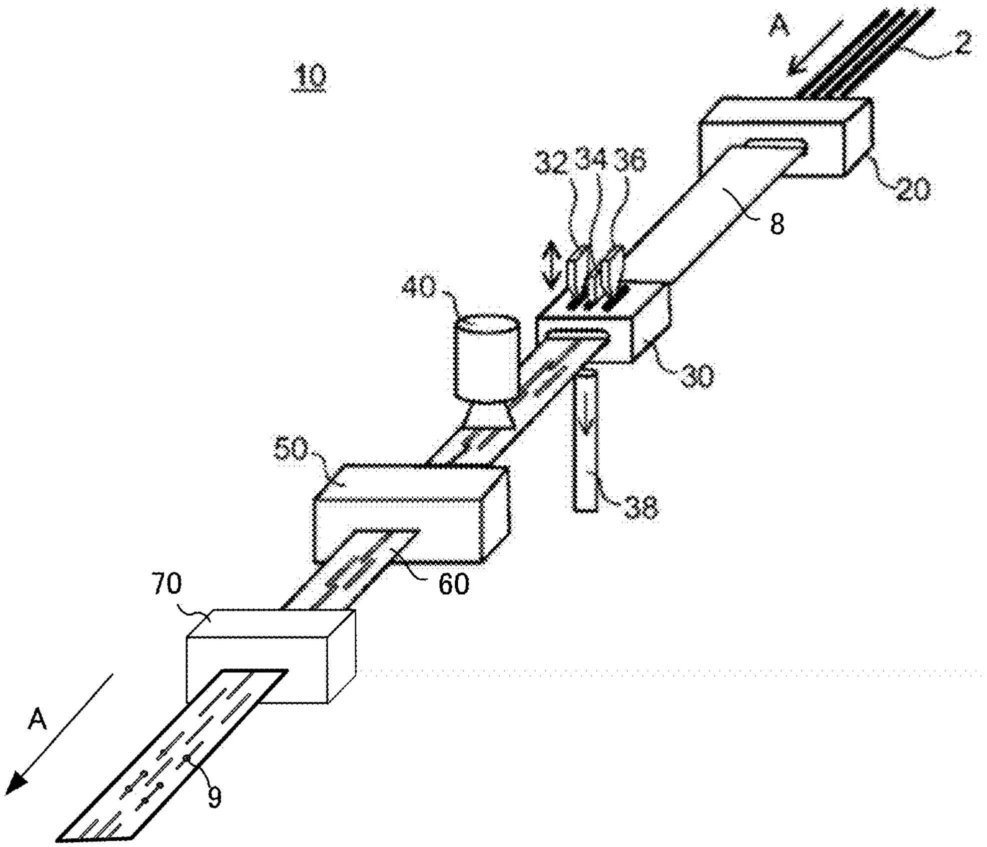
FIG. 6 is a perspective view illustrating an example of a production apparatus for producing a tape-shaped core cable.

In the identification region formation step, for example, as illustrated in FIG. 6, tape-shaped core cable 60 produced at the above-described tape-shaped core cable preparation step is further conveyed in the length direction (the direction indicated by "A" in the figure) by above-described production apparatus 10. Then, dots 9 are formed by applying (dropping) dye ink from ink application apparatus 70 to a region where identification region D of tape-shaped core cable 60 is to be formed. Then, the applied dye ink is dried as necessary.

In this step, the ink is applied such that the ratio of the total area of dots 9 formed on each individual optical fiber 2 within identification region D as seen in plan view to the area of this optical fiber 2 is less than or equal to 20%. The ratio is preferably 15.6% or less, and more preferably 6.1% or greater and 15.6% or less. In order to achieve the above value, it is preferable to finely adjust the dropping position of the ink at a microstage of aforementioned ink application apparatus 70.

The description has been given above in relation to the exemplary case in which the apparatus used in the tape-shaped core cable preparation step is integrated with the apparatus used in the identification region formation step, but these apparatuses may be disposed on separate lines.

EXAMPLES (1) Manufacture of Samples (1.1) Optical Fiber Ribbon Sample

A single-core coated optical fiber having an outer diameter of 250 μm was prepared by applying a primary coating made of a urethane acrylate-based photocurable resin having a Young's modulus of about 5 MPa at 23° C. and a secondary coating made of a urethane acrylate-based photocurable resin having a Young's modulus of about 700 MPa at 23° C. to a quartz glass-based SM optical fiber having an outer diameter of 125 μm.

Thereafter, by using the same production apparatus as in FIG. 6 in a state where 12 single-core coated optical fibers were arranged, tape layer 8 was formed by application of a urethane acrylate-based photocurable resin, and coupling portions 4 and separating portions 6 were formed. Tape-shaped core cable 60 was thus obtained.

Figure 7:
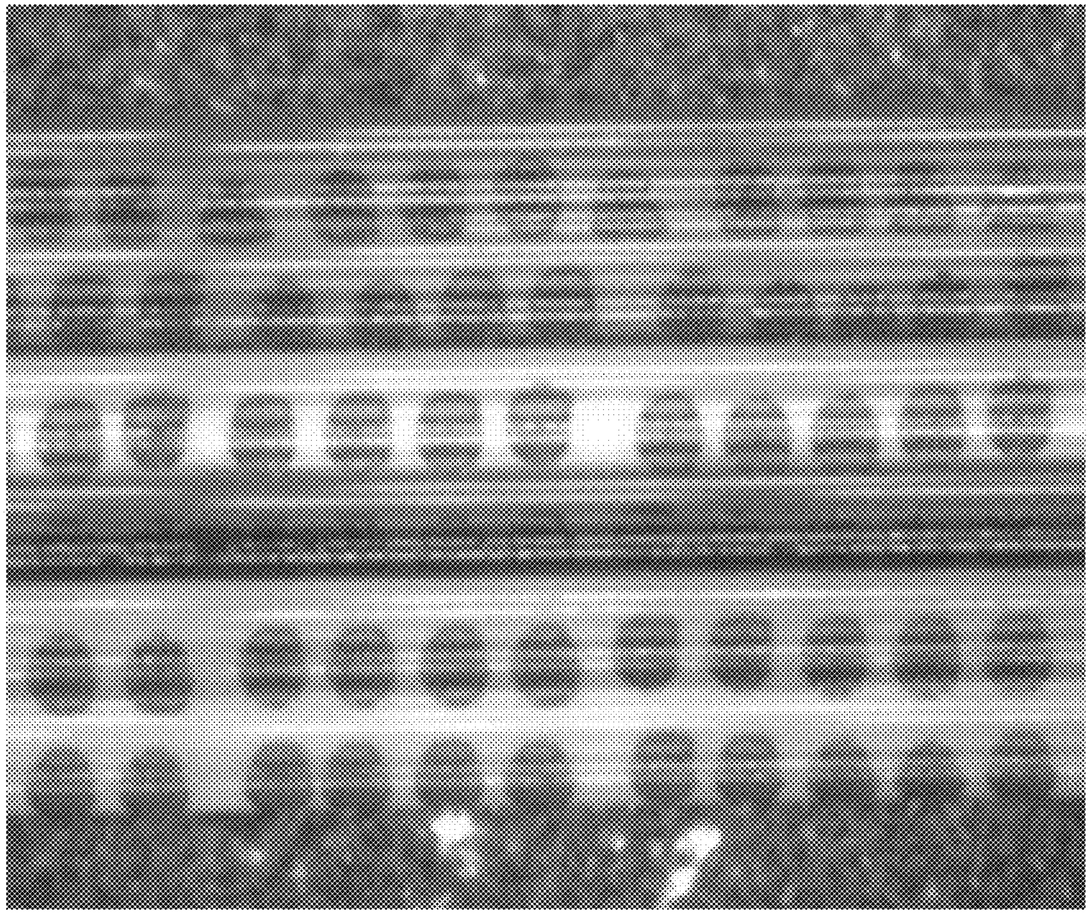
FIG. 7 is a photograph taken when the optical fiber ribbon manufactured in an example was observed with a microscope.

Further, the ink was dropped onto 12 optical fibers 2 of tape-shaped core cable 60 by ink application apparatus 70 to straddle two optical fibers 2. A plurality of identification regions including a plurality of dots 9 were thus formed. In this way, the optical fiber ribbon including the identification regions was obtained. FIG. 7 illustrates a partially enlarged photograph of the identification region of the produced optical fiber ribbon.

In the present Example, in order to verify the relationship between the "ratio of the total area (area in plan view) of the dots formed on each optical fiber within the identification region to the area (area in plan view) of the optical fiber" and the characteristics of the "optical transmission loss," the ink was intentionally so applied as to vary the above-mentioned ratio between the optical fibers. Therefore, the optical fiber ribbon manufactured in the present Example does not correspond to the optical fiber ribbon of the present invention. Further, in the present embodiment, the above-described ratio was calculated for the identification region formed first (first identification region) and the identification region formed last (second identification region).

The areas of the optical fibers and the areas of the dots were specified by observation using Microscope VHX-100F made by Keyence Corporation and by shape measurement using VHX H2M/HIM of Keyence Corporation. The values calculated by these devices are illustrated in Table 1.

(2) Measurement of Optical Transmission Loss at Wavelength of 1310 nm

About 2,000 m of the optical fiber ribbon described above was prepared and wound around a bobbin (this assumes that the optical fiber ribbon was accommodated or mounted at a high density). In this condition, the optical transmission loss at a wavelength of 1310 nm was measured for each of the optical fibers in accordance with IEC60793-1-40. The measured optical transmission losses are illustrated in Table 1. Further, the case where the optical transmission loss at a wavelength of 1310 nm is 0.340 or less was evaluated as "○," and the case where the optical transmission loss at a wavelength of 1310 nm is greater than 0.340 was evaluated as "x."

TABLE 1

| No. | Color | First identification region: Optical fiber area ($mm^2$) | First identification region: Total area of dot overlap region ($mm^2$) | First identification region: Overlap ratio (%) | Second identification region: Optical fiber area ($mm^2$) | Second identification region: Total area of dot overlap region ($mm^2$) | Second identification region: Overlap ratio (%) | Optical transmission loss at wavelength of 1310 nm | Evaluation |
|---|---|---|---|---|---|---|---|---|---|
| 1 | Blue | 3.23 | 0.24 | 7.30 | 3.21 | 0.23 | 7.26 | 0.330 | ○ |
| 2 | Orange | 3.03 | 1.31 | 43.2 | 3.11 | 1.22 | 39.10 | 0.349 | x |
| 3 | Green | 3.28 | 0.51 | 15.6 | 3.26 | 0.24 | 7.43 | 0.333 | ○ |
| 4 | Brown | 2.94 | 1.41 | 47.9 | 2.98 | 1.42 | 47.44 | 0.394 | x |
| 5 | Gray | 3.16 | 0.34 | 10.8 | 3.26 | 0.32 | 9.92 | 0.333 | ○ |
| 6 | White | 3.22 | 1.72 | 53.5 | 3.10 | 1.47 | 47.50 | 0.369 | x |
| 7 | Red | 3.00 | 0.36 | 12.0 | 3.41 | 0.25 | 7.33 | 0.332 | ○ |
| 8 | Black | 2.97 | 1.68 | 56.4 | 3.00 | 1.72 | 57.23 | 0.383 | x |
| 9 | Yellow | 3.25 | 0.20 | 6.13 | 3.14 | 0.28 | 8.95 | 0.329 | ○ |
| 10 | Purple | 3.02 | 1.85 | 61.2 | 3.06 | 1.54 | 50.43 | 0.397 | x |
| 11 | Pink | 3.15 | 0.33 | 10.6 | 2.88 | 0.29 | 9.90 | 0.331 | ○ |
| 12 | Light Blue | 3.01 | 1.59 | 52.8 | 3.30 | 1.66 | 50.20 | 0.392 | x |

As shown in Table 1, the optical fibers in which the ratio of the total area of the dots disposed on the single-core coated optical fiber to the area of the single-core coated optical fiber is less than or equal to 20% when the identification region is seen in plan view were capable of satisfying an extremely small optical transmission loss value of 0.340 or less at a wavelength 1310 nm. On the other hand, the optical transmission loss is likely to increase in all cases where the ratio is greater than 20%, and the optical transmission loss of 0.340 or less cannot be satisfied.

REFERENCE SIGNS LIST

1 Optical fiber ribbon
2, 21 Single-core coated optical fiber
2*a* Optical fiber strand
2*b* Primary coating layer
2*c* Secondary coating layer
4 Coupling portion
6 Separating portion
8 Tape layer
9 Dot
10 Production apparatus for producing optical fiber ribbon
20 Tape die
30 Separation die
32, 34, 36 Separation needle
38 Resin suction apparatus
40 (Upstream) light irradiation apparatus
50 (Downstream) light irradiation apparatus
60 Tape-shaped core cable
70 Ink application apparatus
D Identification region

The invention claimed is:

1. An optical fiber ribbon, comprising:

a plurality of single-core coated optical fibers disposed in parallel; and a plurality of coupling portions disposed between adjacent ones of the plurality of single-core coated optical fibers, wherein the optical fiber ribbon includes an identification region in which a plurality of dots are disposed on the plurality of single-core coated optical fibers and/or the plurality of coupling portions;

a ratio of a total area of the plurality of dots disposed on each of the plurality of single-core coated optical fibers to an area of the single-core coated optical fiber is less than or equal to 20% when the identification region is seen in plan view;

the identification region includes a separating portion in which the coupling portions are not disposed between adjacent ones of the plurality of single-core coated optical fibers; and the dots are disposed astride two adjacent ones of the plurality of single-core coated optical fibers while leaving a margin at an end portion in a width direction of each of the two adjacent ones of the single-core coated optical fibers on a side opposite to the separating portion.

2. The optical fiber ribbon according to claim 1, wherein the ratio of the total area of the plurality of dots disposed on each of the plurality of single-core coated optical fibers to the area of the single-core coated optical fiber is less than or equal to 15.6% when the identification region is seen in plan view.

3. The optical fiber ribbon according to claim 1, wherein the optical fiber ribbon includes a plurality of the identification regions.

* * * * *